US010168066B2

(12) United States Patent
Kimura et al.

(10) Patent No.: US 10,168,066 B2
(45) Date of Patent: Jan. 1, 2019

(54) AIR CONDITIONER WITH OUTDOOR FAN CONTROL IN ACCORDANCE WITH SUCTION PRESSURE AND SUCTION SUPERHEATING DEGREE OF A COMPRESSOR

(71) Applicant: FUJITSU GENERAL LIMITED, Kanagawa (JP)

(72) Inventors: Takashi Kimura, Kanagawa (JP); Kuniko Hayashi, Wakayama (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 309 days.

(21) Appl. No.: 15/025,358

(22) PCT Filed: Jan. 22, 2014

(86) PCT No.: PCT/JP2014/051166
§ 371 (c)(1),
(2) Date: Mar. 28, 2016

(87) PCT Pub. No.: WO2015/045428
PCT Pub. Date: Apr. 2, 2015

(65) Prior Publication Data
US 2016/0238271 A1  Aug. 18, 2016

(30) Foreign Application Priority Data
Sep. 30, 2013  (JP) .................. 2013-204939

(51) Int. Cl.
*F24F 11/00*  (2018.01)
*F25B 13/00*  (2006.01)
(Continued)

(52) U.S. Cl.
CPC .......... *F24F 11/0079* (2013.01); *F24F 3/065* (2013.01); *F24F 11/77* (2018.01);
(Continued)

(58) Field of Classification Search
CPC ........... F24F 11/0079; F24F 2011/0089; F24F 3/065; F25B 13/00; F25B 2313/005;
(Continued)

(56) References Cited

U.S. PATENT DOCUMENTS 5,009,077 A * 4/1991 Okoshi .................. F25B 13/00
62/160
5,050,396 A * 9/1991 Ohkoshi .................. F25B 5/00
62/160
(Continued)

FOREIGN PATENT DOCUMENTS

CN  1222662 A  7/1999
CN  103123147 A  5/2013
(Continued)

OTHER PUBLICATIONS

Extended European Search Report dated Apr. 13, 2017 issued in the corresponding European Patent Application No. 4847564.3.
(Continued)

*Primary Examiner* — Henry Crenshaw
(74) *Attorney, Agent, or Firm* — Rankin, Hill & Clark LLP (57) ABSTRACT

A CPU 210 receives suction pressure PL and a suction temperature Te, calculates a saturation temperature corresponding to the evaporation pressure Ts1 by using the suction pressure PL, and calculates a suction superheating degree SHs of a compressor 21 by using the suction temperature Te and the saturation temperature corresponding to the evaporation pressure Ts1. The CPU 210 reads a current opening degree De of an outdoor expansion valve 24. Next, the CPU 210 uses the received suction pressure PL and opening degree De of the outdoor expansion valve 24 and the calculated suction superheating degree SHs, refers to an outdoor fan control table 300, and determines a control aspect of an outdoor fan 27. The CPU 210 executes control (Continued)

of the outdoor fan 27 in accordance with the control aspect that is determined by referring to an outdoor fan control table 300.

2 Claims, 4 Drawing Sheets

(51) Int. Cl.

| | |
|---|---|
| *F24F 3/06* | (2006.01) |
| *F25B 47/02* | (2006.01) |
| *F25B 41/06* | (2006.01) |
| *F25B 49/02* | (2006.01) |
| *F24F 11/77* | (2018.01) |
| *F24F 11/42* | (2018.01) |

(52) U.S. Cl.
CPC ............ F25B 13/00 (2013.01); F25B 41/062 (2013.01); F25B 47/025 (2013.01); F25B 49/02 (2013.01); *F24F 11/42* (2018.01); *F25B 2313/005* (2013.01); *F25B 2313/006* (2013.01); *F25B 2313/0233* (2013.01); *F25B 2313/0294* (2013.01); *F25B 2313/02741* (2013.01); *F25B 2313/0315* (2013.01); *F25B 2600/2513* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *Y02B 30/746* (2013.01)

(58) Field of Classification Search
CPC .... F25B 2313/02741; F25B 2313/0294; F25B 2313/0315; F25B 2700/1931
USPC .......................................................... 62/216
See application file for complete search history.

(56) References Cited

U.S. PATENT DOCUMENTS

| | | | | |
|---|---|---|---|---|
| 6,012,294 | A * | 1/2000 | Utsumi .................. | F25B 13/00 62/81 |
| 2006/0042277 | A1 * | 3/2006 | Sadegh .................. | F24F 11/30 62/129 |
| 2006/0266074 | A1 * | 11/2006 | Groll ..................... | F25B 1/10 62/510 |
| 2010/0089083 | A1 * | 4/2010 | Awwad ................. | F25B 41/062 62/216 |
| 2010/0218527 | A1 * | 9/2010 | Kitagishi ............... | F24F 11/008 62/228.5 |
| 2011/0132011 | A1 * | 6/2011 | Kojima ................. | F25B 49/027 62/180 |
| 2012/0042674 | A1 * | 2/2012 | Takenaka .............. | F24F 3/06 62/180 |
| 2012/0180506 | A1 * | 7/2012 | Ochiai .................. | F25B 49/005 62/126 |
| 2012/0318011 | A1 * | 12/2012 | Ochiai .................. | F25B 49/005 62/127 |
| 2013/0167571 | A1 * | 7/2013 | Nakagawa ............ | F24F 11/0008 62/176.4 |
| 2013/0192284 | A1 * | 8/2013 | Kawai ................... | F25D 21/06 62/156 |
| 2014/0131599 | A1 * | 5/2014 | Golden ................. | F25B 41/062 251/129.01 |

FOREIGN PATENT DOCUMENTS

| | | |
|---|---|---|
| CN | 103216981 A | 7/2013 |
| CN | 103225866 A | 7/2013 |
| EP | 1862745 A2 | 12/2007 |
| EP | 2623899 A2 | 8/2013 |
| JP | 59084062 A2 | 5/1984 |
| JP | 5184181 A2 | 7/1993 |
| JP | 2006138577 A2 | 6/2006 |
| JP | 2006349258 A2 | 12/2006 |
| JP | 2008275216 A2 | 11/2008 |
| JP | 2009228928 A2 | 10/2009 |
| JP | 2010181052 A2 | 8/2010 |

OTHER PUBLICATIONS

International Search Report dated Apr. 28, 2014 filed in PCT/JP2014/051166.

Written Opinion of the International Searching Authority dated Apr. 28, 2014 filed in PCT/JP2014/051166, and its English translation thereof.

* cited by examiner

300 OUTDOOR FAN CONTROL TABLE

| SUCTION PRESSURE PL (MPa) | SUCTION SUPERHEATING DEGREE SHs (°C) | OUTDOOR EXPANSION VALVE OPENING DEGREE De | OUTDOOR FAN CONTROL |
|---|---|---|---|
| PL < A | SHs > C | FULL OPEN | REDUCE |
| | | OTHER THAN FULL OPEN | MAINTAIN |
| | SHs ≤ C | — | INCREASE |
| A ≤ PL < B | SHs > C | FULL OPEN | REDUCE |
| | | OTHER THAN FULL OPEN | MAINTAIN |
| | SHs ≤ C | — | MAINTAIN |
| PL ≥ B | — | — | REDUCE |

FIG. 3

400 OUTDOOR FAN ROTATIONAL SPEED TABLE

| ROTATIONAL SPEED LEVEL | FAN ROTATIONAL SPEED (rpm) |
|---|---|
| 1 | 100 |
| 2 | 200 |
| 3 | 300 |
| 4 | 400 |
| 5 | 500 |
| 6 | 600 |
| 7 | 700 |
| 8 | 800 |
| 9 | 900 |
| 10 | 1000 |

FIG. 4

AIR CONDITIONER WITH OUTDOOR FAN CONTROL IN ACCORDANCE WITH SUCTION PRESSURE AND SUCTION SUPERHEATING DEGREE OF A COMPRESSOR

TECHNICAL FIELD

The present invention relates to an air conditioner in which at least one outdoor unit and at least one indoor unit are mutually coupled by plural refrigerant pipes.

BACKGROUND ART

An air conditioner in which at least one outdoor unit and at least one indoor unit are mutually coupled by plural refrigerant pipes has been suggested. In the case where a temperature of an outdoor heat exchanger becomes equal to or less than 0° C. when this air conditioner performs a heating operation, the outdoor heat exchanger may be frosted. When the outdoor heat exchanger is frosted, ventilation to the outdoor heat exchanger is inhibited by the frost, and thus heat exchange efficiency in the outdoor heat exchanger may be degraded. Thus, when frosting occurs to the outdoor heat exchanger, a defrosting operation has to be performed to defrost the outdoor heat exchanger.

For example, in an air conditioner described in Patent Literature 1, an outdoor unit that includes a compressor, a four-way valve, an outdoor heat exchanger, an outdoor fan, and an outdoor expansion valve is coupled to two indoor units, each of which includes an indoor heat exchanger, an indoor expansion valve, and an indoor fan, via a gas refrigerant pipe and a liquid refrigerant pipe. In the case where, in this air conditioner, a defrosting operation is performed during a heating operation, the rotation of the outdoor fan and the rotation of the indoor fan are stopped. In conjunction with this, the compressor is stopped once, the four-way valve is switched such that the outdoor heat exchanger is shifted from a state of functioning as an evaporator (heating cycle) to a state of functioning as a condenser (cooling cycle), and the compressor is activated again. When the outdoor heat exchanger functions as the condenser, a high-temperature refrigerant discharged from the compressor flows into the outdoor heat exchanger and melts frost formed on the outdoor heat exchanger. Thus, the outdoor heat exchanger can be defrosted.

During the defrosting operation, however, as described above, a refrigerant circuit is switched from a heating cycle to the cooling cycle. For this reason, the heating operation is interrupted during the defrosting operation. Thus, a sense of comfort of the user may be hindered by frequent switching to the defrosting operation during the heating operation. In order to solve this problem, a typical air conditioner, in which a rotational speed of the outdoor fan is controlled so as to prevent the temperature (an evaporation temperature) of the outdoor heat exchanger during the heating operation from becoming equal to or less than a temperature (0° C.) at which the outdoor heat exchanger is frosted, is available. More specifically, evaporation pressure that is higher by a predetermined value than evaporation pressure that corresponds to the temperature at which the outdoor heat exchanger is frosted (0.70 MPa at 0° C.) is set as threshold pressure. The rotational speed of the outdoor fan is controlled such that the evaporation pressure during the heating operation does not become equal to or less than this threshold pressure.

In the above control, the evaporation pressure is periodically detected (detected by using a pressure sensor that is provided on a suction side of the compressor). If the detected evaporation pressure is equal to or less than the threshold pressure, the rotational speed of the outdoor fan is increased. Accordingly, an amount of ambient air flowing into the outdoor heat exchanger is increased, and evaporation capacity is increased. Thus, the evaporation pressure is increased. When the evaporation pressure becomes higher than the threshold pressure, the current rotational speed of the outdoor fan is maintained and controlled such that the evaporation pressure does not become equal to or less than the threshold pressure.

CITATION LIST

Patent Literature

Patent Literature 1: JP-A-2009-228928

SUMMARY OF INVENTION

Problems to be Solved by the Invention

As described above, in the case where the rotational speed of the outdoor fan is increased so as to increase the evaporation pressure when the evaporation pressure is equal to or less than the threshold pressure, a suction superheating degree of the compressor (a superheating degree obtained by subtracting a saturation temperature corresponding to the evaporation pressure from a refrigerant temperature on a refrigerant outlet side of the outdoor heat exchanger) is also increased. Then, when the suction superheating degree is increased, a discharge temperature of the compressor is increased.

Usually, in the air conditioner, an opening degree of the outdoor expansion valve is controlled in accordance with the discharge temperature such that the discharge temperature of the compressor does not increase to exceed a performance upper limit value that is individually defined for the compressor. When the discharge temperature is increased, the opening degree of the outdoor expansion valve is increased. Accordingly, an amount of the refrigerant that is suctioned into the compressor is increased so as to suppress an increase in the discharge temperature.

However, when a load of the outdoor unit is large, there is a case where the opening degree of the outdoor expansion valve is set at a maximum opening degree so as to increase a refrigerant circulation amount in the refrigerant circuit. In this case, the discharge temperature cannot be reduced by opening degree control of the outdoor expansion valve. At this time, in the case where the rotational speed of the outdoor fan is increased so as to increase the evaporation pressure, the suction superheating degree of the compressor is increased. Accordingly, the discharge temperature is further increased, and the discharge temperature may exceed the performance upper limit value.

The present invention solves the above-described problem. An object of the present invention is to provide an air conditioner that suppresses an increase in a discharge temperature of a compressor during a heating operation while suppressing frosting on an outdoor heat exchanger.

Solutions to the Problems

In order to solve the above problem, an air conditioner of the present invention includes an indoor unit and an outdoor unit that are coupled by a liquid pipe and a gas pipe. The outdoor unit has a compressor, a flow passage switching unit, an outdoor heat exchanger, an outdoor expansion valve, an outdoor fan, a suction pressure detector, a suction temperature detector, and an outdoor unit controller. The suction pressure detector detects suction pressure that is pressure of a refrigerant suctioned into the compressor. The suction temperature detector detects a suction temperature that is a temperature of the refrigerant suctioned into the compressor. The outdoor unit controller controls the outdoor fan in accordance with the detected suction pressure when the outdoor heat exchanger functions as an evaporator. In addition, the outdoor unit controller calculates a suction superheating degree that is a superheating degree of the refrigerant suctioned into the compressor by using the detected suction pressure and suction temperature. The outdoor unit controller controls the outdoor fan such that the suction pressure becomes equal to or more than first threshold pressure that is higher by a predetermined value than evaporation pressure and lower than second threshold pressure that is higher than the first threshold pressure when the suction superheating degree is equal to or less than a predetermined threshold superheating degree, the evaporation pressure corresponding to a temperature of the outdoor heat exchanger at which the outdoor heat exchanger is frosted. The outdoor unit controller controls the outdoor fan such that the suction superheating degree becomes equal to or less than the threshold superheating degree when the suction superheating degree is higher than the threshold superheating degree and the suction pressure is lower than the second threshold pressure.

Advantageous Effects of the Invention

According to the air conditioner of the present invention that is configured as described above, the outdoor fan is appropriately controlled in accordance with the suction pressure and the suction superheating degree of the compressor. Accordingly, a discharge temperature of the compressor can be prevented from being increased to exceed a performance upper limit value while frosting on the outdoor heat exchanger is suppressed.

DESCRIPTION OF EMBODIMENTS

A detailed description will hereinafter be made on embodiments of the present invention based on the accompanying drawings. A description will be made by raising an example of an air conditioner in which three indoor units are coupled in parallel to one outdoor unit and in which a cooling operation or a heating operation can simultaneously be performed by all of the indoor units as the embodiments. It should be noted that the present invention is not limited to the following embodiments, but various modifications can be made thereto within a scope of the gist of the present invention.

Example 1

Figure 1:
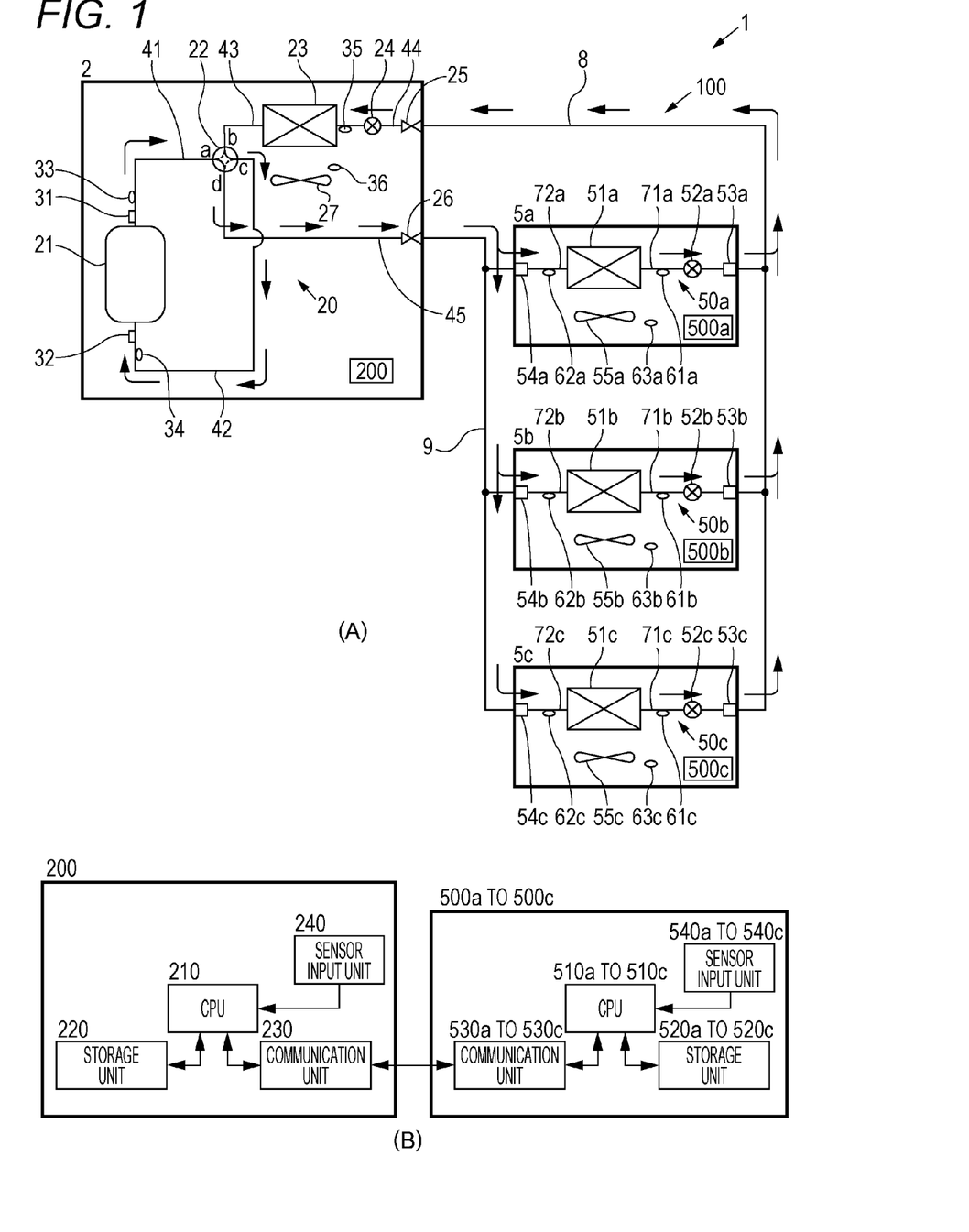
FIG. 1 is an explanatory view of an air conditioner in an embodiment of the present invention, in which (A) is a refrigerant circuit diagram, and (B) is a block diagram of an outdoor unit controller and an indoor unit controller.

As depicted in FIG. 1(A), an air conditioner 1 of this example includes: one outdoor unit 2 that is installed outdoors; and three indoor units 5a to 5c that are coupled in parallel to the outdoor unit 2 via a liquid pipe 8 and a gas pipe 9. In detail, one end of the liquid pipe 8 is coupled to a closing valve 25 of the outdoor unit 2, and the other end thereof is branched and respectively coupled to liquid pipe coupling portions 53a to 53c of the indoor units 5a to 5c. In addition, one end of the gas pipe 9 is coupled to a closing valve 26 of the outdoor unit 2, and the other end thereof is branched and respectively coupled to gas pipe coupling portions 54a to 54c of the indoor units 5a to 5c. Thus, a refrigerant circuit 100 of the air conditioner 1 is configured.

First, the outdoor unit 2 will be described. The outdoor unit 2 includes a compressor 21, a four-way valve 22 as a flow passage switching unit, an outdoor heat exchanger 23, an outdoor expansion valve 24, the closing valve 25, to which the one end of the liquid pipe 8 is coupled, the closing valve 26, to which the one end of the gas pipe 9 is coupled, and an outdoor fan 27. Then, each of devices other than the outdoor fan 27 is mutually coupled by each refrigerant pipe, which will be described in detail below, and constitutes an outdoor unit refrigerant circuit 20 for constituting a part of the refrigerant circuit 100.

The compressor 21 is a variable-capacity-type compressor that can change operation capacity by being driven by a motor, not depicted, whose rotational speed is controlled by an inverter. A refrigerant discharge side of the compressor 21 is coupled to a port a of the four-way valve 22, which will be described below, via a discharge pipe 41. In addition, a refrigerant suction side of the compressor 21 is coupled to a port c of the four-way valve 22, which will be described below, via an intake pipe 42.

The four-way valve 22 is a valve for switching a flow direction of the refrigerant and includes four ports of a, b, c, and d. As described above, the port a is coupled to the refrigerant discharge side of the compressor 21 via the discharge pipe 41. A port b is coupled to one of refrigerant entry/exit openings of the outdoor heat exchanger 23 via a refrigerant pipe 43. As described above, the port c is coupled to the refrigerant suction side of the compressor 21 via the intake pipe 42. A port d is coupled to the closing valve 26 via an outdoor unit gas pipe 45.

The outdoor heat exchanger 23 exchanges heat between the refrigerant and ambient air that is taken into the outdoor unit 2 by rotation of the outdoor fan 27, which will be described below. As described above, one of the refrigerant entry/exit openings of the outdoor heat exchanger 23 is coupled to the port b of the four-way valve 22 via the refrigerant pipe 43, and the other of the refrigerant entry/exit openings is coupled to the closing valve 25 via an outdoor unit liquid pipe 44.

The outdoor expansion valve 24 is provided in the outdoor unit liquid pipe 44. The outdoor expansion valve 24 is an electronic expansion valve, and adjusts an amount of the refrigerant that flows into the outdoor heat exchanger 23 or an amount of the refrigerant that flows out from the outdoor heat exchanger 23 when an opening degree thereof is adjusted. The opening degree of the outdoor expansion valve 24 is brought to full open in the case where the air conditioner 1 performs the cooling operation. In addition, in the case where the air conditioner 1 performs the heating operation, a discharge temperature is prevented from exceeding a performance upper limit value by the control in accordance with the discharge temperature of the compressor 21 detected by a discharge temperature sensor 33, which will be described below.

The outdoor fan 27 is formed of a resin material and arranged in the vicinity of the outdoor heat exchanger 23. The outdoor fan 27 is rotated by an undepicted fan motor so as to take the ambient air into the outdoor unit 2 from an undepicted inlet, and discharges the ambient air that has exchanged heat with the refrigerant in the outdoor heat exchanger 23 to the outside of the outdoor unit 2 from an undepicted outlet.

In addition to the configuration that has been described so far, the outdoor unit 2 is provided with various types of sensors. As depicted in FIG. 1(A), the discharge pipe 41 is provided with: a high-pressure sensor 31 for detecting pressure of the refrigerant that is discharged from the compressor 21; and a discharge temperature sensor 33 for detecting a temperature of the refrigerant that is discharged from the compressor 21. The intake pipe 42 is provided with: a low-pressure sensor 32 as a low-pressure detector for detecting pressure (suction pressure) of the refrigerant that is suctioned into the compressor 21; and a suction temperature sensor 34 as a suction temperature detector for detecting a temperature (suction temperature) of the refrigerant that is suctioned into the compressor 21.

The outdoor heat exchanger 23 is provided with a heat exchange temperature sensor 35 for detecting frosting during the heating operation or melting of frost during a defrosting operation. In addition, an ambient air temperature sensor 36 for detecting a temperature of the ambient air that flows into the outdoor unit 2, that is, an ambient air temperature is provided near the undepicted inlet of the outdoor unit 2.

The outdoor unit 2 includes an outdoor unit controller 200. The outdoor unit controller 200 is installed on a control board that is housed in an undepicted electric component box of the outdoor unit 2. As depicted in FIG. 1(B), the outdoor unit controller 200 includes a CPU 210, a storage unit 220, a communication unit 230, and a sensor input unit 240.

The storage unit 220 includes a ROM or a RAM, and stores a control program of the outdoor unit 2, detection values that correspond to detection signals from the various sensors, control states of the compressor 21 and the outdoor fan 27, an outdoor fan control table 300 and an outdoor fan rotational speed table 400, which will be described below, and the like. The communication unit 230 is an interface that performs communication among the indoor units 5a to 5c. The sensor input unit 240 receives detection results of the various sensors in the outdoor unit 2 and outputs the detection results to the CPU 210.

The CPU 210 receives the detection result of each of the sensors in the outdoor unit 2, just as described, via the sensor input unit 240. In addition, the CPU 210 receives control signals, which are transmitted from the indoor units 5a to 5c, via the communication unit 230. Based on the received detection results and control signals, the CPU 210 executes drive control of the compressor 21 and the outdoor fan 27. Furthermore, based on the received detection results and control signals, the CPU 210 executes switching control of the four-way valve 22. Moreover, based on the received detection results and control signals, the CPU 210 executes opening degree control of the outdoor expansion valve 24.

Next, the three indoor units 5a to 5c will be described. The three indoor units 5a to 5c respectively include indoor heat exchangers 51a to 51c, indoor expansion valves 52a to 52c, the liquid pipe coupling portions 53a to 53c, to which the branched other ends of the liquid pipe 8 are respectively coupled, the gas pipe coupling portions 54a to 54c, to which the branched other ends of the gas pipe 9 are respectively coupled, and indoor fans 55a to 55c. Then, the devices other than the indoor fans 55a to 55c are mutually coupled by the refrigerant pipes, which will be described in detail below, and constitute indoor unit refrigerant circuits 50a to 50c, each of which constitutes a part of the refrigerant circuit 100.

It should be noted that, since configurations of the indoor units 5a to 5c are all the same, only the configuration of the indoor unit 5a will be described in the following description, and the indoor units 5b and 5c will not be described. In addition, in FIG. 1, last letters of the reference signs given to components of the indoor unit 5a are changed from a to b and c, and the changed reference signs are given to components of the indoor units 5b and 5c that correspond to the components of the indoor unit 5a.

The indoor heat exchanger 51a exchanges heat between the refrigerant and indoor air that is taken into the indoor unit 5a from an undepicted inlet by the indoor fan 55a, which will be described below. One of refrigerant entry/exit openings of the indoor heat exchanger 51a is coupled to the liquid pipe coupling portion 53a via an indoor unit liquid pipe 71a, and the other of the refrigerant entry/exit openings is coupled to the gas pipe coupling portion 54a via an indoor unit gas pipe 72a. The indoor heat exchanger 51a functions as an evaporator when the indoor unit 5a performs the cooling operation, and functions as a condenser when the indoor unit 5a performs the heating operation.

It should be noted that each of the refrigerant pipes is coupled to the liquid pipe coupling portion 53a and the gas pipe coupling portion 54a by welding, a flare nut, or the like.

The indoor expansion valve 52a is provided in the indoor unit liquid pipe 71a. The indoor expansion valve 52a is an electronic expansion valve. An opening degree thereof is adjusted in accordance with requested cooling capacity in the case where the indoor heat exchanger 51a functions as the evaporator, and is adjusted in accordance with requested heating capacity in the case where the indoor heat exchanger 51a functions as the condenser.

The indoor fan 55a is formed of a resin material and arranged in the vicinity of the indoor heat exchanger 51a. The indoor fan 55a is rotated by an undepicted fan motor so as to take the indoor air into the indoor unit 5a from the undepicted inlet, and supplies the indoor air that has exchanged heat with the refrigerant in the indoor heat exchanger 51a to the inside from an undepicted outlet.

In addition to the configuration that has been described so far, the indoor unit 5a is provided with various types of sensors. A liquid-side temperature sensor 61a for detecting a temperature of the refrigerant that flows into the indoor heat exchanger 51a or of the refrigerant that flows out from the indoor heat exchanger 51a is provided between the indoor heat exchanger 51a and the indoor expansion valve 52a in the indoor unit liquid pipe 71a. A gas-side temperature sensor 62a for detecting a temperature of the refrigerant that flows out from the indoor heat exchanger 51a or of the refrigerant that flows into the indoor heat exchanger 51a is provided in the indoor unit gas pipe 72a. In addition, an indoor temperature sensor 63a for detecting a temperature of the indoor air that flows into the indoor unit 5a, that is, an indoor temperature is provided in the vicinity of the undepicted inlet of the indoor unit 5a.

The indoor unit 5a also includes an indoor unit controller 500a. The indoor unit controller 500a is installed on a control board that is housed in an undepicted electric component box of the indoor unit 5a. As depicted in FIG. 1(B), the indoor unit controller 500a includes a CPU 510a, a storage unit 520a, a communication unit 530a, and a sensor input unit 540a.

The storage unit 520a includes a ROM or a RAM, and stores a control program of the indoor unit 5a, detection values that correspond to detection signals from the various sensors, information on setting related to an air conditioning operation by a user, and the like. The communication unit 530a is an interface that performs communication between the outdoor unit 2 and the other indoor units 5b and 5c. The sensor input unit 540a receives detection results of the indoor unit 5a from the various sensors and outputs the detection results to the CPU 510a.

The CPU 510a receives the detection result of each of the sensors in the indoor unit 5a, just as described, via the sensor input unit 540a. In addition, the CPU 510a receives a signal that includes operation information, timer operation setting, or the like set by the user through an operation of an undepicted remote controller via an undepicted remote controller light receiving portion. Based on the received detection results and the signal transmitted from the remote controller, the CPU 510a executes opening degree control of the indoor expansion valve 52a and drive control of the indoor fan 55a. In addition, the CPU 510a transmits an operation start/stop signal or a control signal that includes the operation information (a set temperature, the indoor temperature, and the like) to the outdoor unit 2 via the communication unit 530a.

Next, a description will be made on a flow of the refrigerant and an operation of each component in the refrigerant circuit 100 during the air conditioning operation of the air conditioner 1 in this embodiment by using FIG. 1(A). It should be noted that a case where the indoor units 5a to 5c perform the heating operation will be described in the following description, and a detailed description on a case where the cooling and/or defrosting operation is performed will not be made. Arrows in FIG. 1(A) indicate the flow of the refrigerant during the heating operation.

As depicted in FIG. 1(A), in the case where the indoor units 5a to 5c perform the heating operation, the outdoor unit controller 200 switches the four-way valve 22 to a state indicated by a solid line, that is, such that the port a and the port d of the four-way valve 22 communicate with each other and the port b and the port c communicate with each other. In this way, the outdoor heat exchanger 23 functions as the evaporator, and the indoor heat exchangers 51a to 51c function as the condenser.

The high-pressure refrigerant that is discharged from the compressor 21 flows through the discharge pipe 41, flows into the four-way valve 22, flows out from the four-way valve 22, flows through the outdoor unit gas pipe 45, the gas pipe 9, and the coupling portions 54a to 54c, and flows into the indoor units 5a to 5c. The refrigerant flowing into the indoor units 5a to 5c flows into the indoor heat exchangers 51a to 51c through the indoor unit gas pipes 72a to 72c and is condensed by exchanging heat with the indoor air taken into the indoor units 5a to 5c by rotation of the indoor fans 55a to 55c. Just as described above, a room where the indoor units 5a to 5c are installed is heated when the indoor heat exchangers 51a to 51c function as the condensers, and the indoor air that is exchanged heat with the refrigerant in the indoor heat exchangers 51a to 51c is blown into the room from the undepicted outlet.

The refrigerant flowing out from the indoor heat exchangers 51a to 51c flows through the indoor unit liquid pipes 71a to 71c, passes through the indoor expansion valves 52a to 52c, and then decompressed. The decompressed refrigerant flows through the indoor unit liquid pipes 71a to 71c and the coupling portions 53a to 53c and flows into the liquid pipe 8.

The refrigerant flowing into the outdoor unit 2 through the liquid pipe 8 and the closing valve 25 flows through the outdoor unit liquid pipe 44. Then, the refrigerant is further decompressed when passing through the outdoor expansion valve 24 whose opening degree is adjusted in accordance with the discharge temperature of the compressor 21 detected by the discharge temperature sensor 33. The refrigerant flowing into the outdoor heat exchanger 23 from the outdoor unit liquid pipe 44 exchanges heat with the ambient air taken into the outdoor unit 2 by the rotation of the outdoor fan 27, and is evaporated. The refrigerant that flows out from the outdoor heat exchanger 23 flows through the refrigerant pipe 43 and the intake pipe 42, is suctioned into the compressor 21, and is compressed again.

As described above, the heating operation of the air conditioner 1 is performed when the refrigerant circulates through the refrigerant circuit 100.

It should be noted that, in the case where the indoor units 5a to 5c perform the cooling and/or defrosting operation, the outdoor unit controller 200 switches the four-way valve 22 to a state indicated by a broken line, that is, such that the port a and the port b of the four-way valve 22 are communicated with each other and the port c and the port d thereof are communicated with each other. Thus, the outdoor heat exchanger 23 functions as the condenser, and the indoor heat exchangers 51a to 51c function as the evaporators.

Next, a description will be made on an operation, an action, and an effect of the refrigerant circuit according to the present invention in the air conditioner 1 of this embodiment by using FIGS. 1 to 4.

Figure 2:
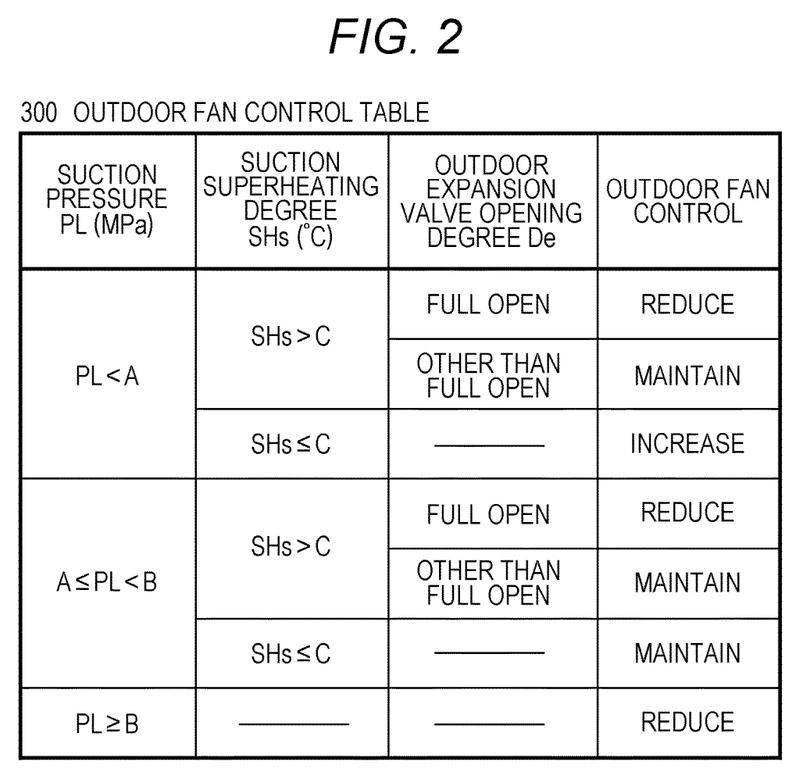
FIG. 2 is an outdoor fan control table in the embodiment of the present invention.
Figure 3:
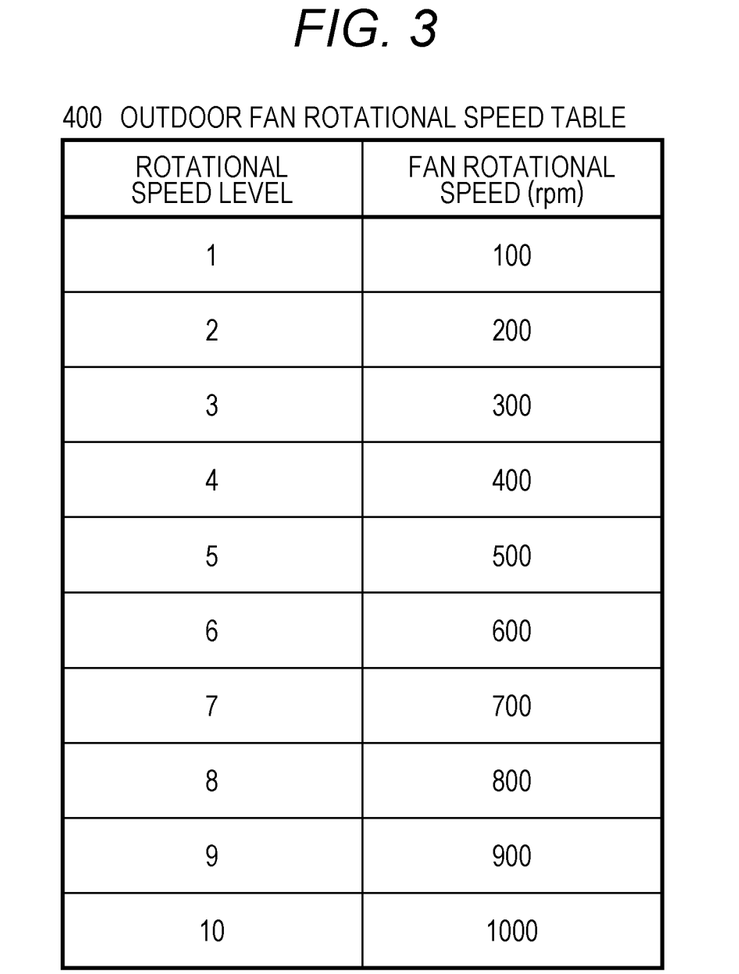
FIG. 3 is an outdoor fan rotational speed table in the embodiment of the present invention.

The storage unit 220 that is provided in an outdoor unit control means 200 of the outdoor unit 2 stores in advance the outdoor fan control table 300 depicted in FIG. 2 and the outdoor fan rotational speed table 400 depicted in FIG. 3.

First, a description will be made on the outdoor fan rotational speed table 400 by using FIG. 3. The outdoor fan rotational speed table 400 defines the rotational speed of the outdoor fan 27 (unit: rpm) in plural rotational speed levels between a maximum rotational speed and a minimum rotational speed defined for the outdoor unit 2. In this embodiment, the maximum rotational speed of the outdoor fan 27 is set at 1000 rpm, and the minimum rotational speed thereof is set at 100 rpm. For every 100 rpm, the one rotational speed level corresponds to the rotational speed therebetween. It is set as follows: the rotational speed 100 rpm: the rotational speed level 1, the rotational speed 200 rpm: the rotational speed level 2, . . . , and the rotational speed 1000 rpm: the rotational speed level 10.

The CPU 210 of the outdoor unit controller 200 receives the ambient air temperature that is detected by the ambient air temperature sensor 36 via the sensor input unit 240 at a start of the air conditioning operation. The CPU 210 determines the rotational speed level of the outdoor fan 27 during activation of the air conditioner 1 by using the received ambient air temperature. The CPU 210 refers to the outdoor fan rotational speed table 400 and activates the outdoor fan 27 at the rotational speed that corresponds to the determined rotational speed level. In addition to the above setting temperature, the indoor temperature, and the ambient air temperature, the CPU 210 receives values detected by each of the temperature sensors or the pressure sensor of the outdoor unit 2 via the sensor input unit 240 and determines the rotational speed level of the outdoor fan 27 by using these during the air conditioning operation. Furthermore, the CPU 210 refers to the outdoor fan rotational speed table 400 and drives the outdoor fan 27 at the rotational speed that corresponds to the determined rotational speed level.

Next, a description will be made on the outdoor fan control table 300 by using FIG. 2. The outdoor fan control table 300 defines a control aspect of the outdoor fan 27 at a time that the air conditioner 1 performs the heating operation in accordance with suction pressure PL of the compressor 21 (unit: MPa), a suction superheating degree SHs of the compressor 21 (unit: ° C.), and an opening degree De of the outdoor expansion valve 24. Here, the suction pressure PL corresponds to evaporation pressure in the outdoor heat exchanger 23 that functions as the evaporator during the heating operation, and can be detected by the low-pressure sensor 32. In addition, the suction superheating degree SHs is a superheating degree of the refrigerant that is suctioned into the compressor 21, and can be calculated by subtracting a saturation temperature corresponding to the evaporation pressure, which is obtained by using the suction pressure PL, from the temperature of the refrigerant that is suctioned into the compressor 21 and is detected by the suction temperature sensor 34. Furthermore, the opening degree De of the outdoor expansion valve 24 is stored in the storage unit 220, and, for example, is stored by using the number of pulses that corresponds to the opening degree De and is added to (an undepicted stepping motor provided in) the outdoor expansion valve 24.

In the outdoor fan control table 300, a case where the suction pressure PL is lower than A as first threshold pressure and a case where the suction pressure PL is equal to or more than A and lower than B as second threshold pressure are each divided into a case where the suction superheating degree SHs exceeds C as a threshold superheating degree and a case where the suction superheating degree SHs is equal to or less than C. Furthermore, the case where the suction superheating degree SHs exceeds C is divided into cases where the opening degree De of the outdoor expansion valve is fully opened and where not. Accordingly, the control aspect of the outdoor fan 27 is defined. First, in the case where the suction pressure PL is lower than A, the outdoor fan control is in "increase" regardless of the opening degree De of the outdoor expansion valve 24 when the suction superheating degree SHs is equal to or less than C. Furthermore, in this case, in the case where the suction superheating degree SHs exceeds C, the outdoor fan control is in "reduce" when the opening degree De of the outdoor expansion valve 24 is full open, and is in "maintain" when the opening degree De of the outdoor expansion valve 24 is not full open. Next, in the case where the suction pressure PL is equal to or more than A and lower than B, the outdoor fan control is in "maintain" regardless of the opening degree De of the outdoor expansion valve 24 when the suction superheating degree SHs is equal to or less than C. Furthermore, in this case, in the case where the suction superheating degree SHs exceeds C, the outdoor fan control is in "reduce" when the opening degree De of the outdoor expansion valve is full open, and is in "maintain" when the opening degree De of the outdoor expansion valve 24 is not full open. It should be noted that in the case where the suction pressure PL is equal to or more than B, the outdoor fan control is in "reduce" regardless of the suction superheating degree SHs and the opening degree De of the outdoor expansion valve 24.

Here, A as the first threshold pressure of the suction pressure PL is a value that is higher by a predetermined value than the evaporation pressure (0.70 MPa) that corresponds to the temperature (0° C.) at which the outdoor heat exchanger 23 is frosted during the heating operation, and is 0.75 MPa, for example. In addition, B as the second threshold pressure of the suction pressure PL is a value that is higher by a predetermined value than the first threshold pressure A, and is 0.85 Mpa, for example. This second threshold pressure B is threshold pressure that is provided to secure a pressure difference between high-pressure side pressure (discharge pressure of the compressor 21) and low-pressure side pressure (the suction pressure PL of the compressor 21) of the refrigerant circuit 100 and to suppress an increase in noise that is associated with an increase in the rotational speed of the outdoor fan 27. As described in the outdoor fan control table 300, when the suction pressure PL becomes equal to or more than B, the rotational speed of the outdoor fan 27 is reduced. Accordingly, a reduction in the pressure difference resulted from an increase in the suction pressure PL is avoided while the noise caused by the outdoor fan 27 is reduced.

In addition, C as the threshold superheating degree of the suction superheating degree SHs is defined in consideration of the discharge temperature of the compressor 21 and is 5° C., for example. When the suction superheating degree SHs is equal to or more than C, the temperature of the refrigerant that is suctioned into the compressor 21 is high. Thus, a possibility that the discharge temperature of the compressor 21 exceeds the performance upper limit value is increased. When the suction superheating degree SHs is lower than C, the temperature of the refrigerant that is suctioned into the compressor 21 is low. Thus, possibility that the discharge temperature of the compressor 21 exceeds the performance upper limit value is reduced.

It should be noted that the first threshold pressure A, the second threshold pressure B, and the threshold superheating degree C. described above are obtained in advance by a test or the like and are individually defined for the each air conditioner.

In addition, the opening degree De of the outdoor expansion valve 24 is divided into the case of full open and the case of non-full open. In the case where the opening degree De of the outdoor expansion valve 24 is full open, the opening degree cannot be increased further, and the amount of the refrigerant that flows from the outdoor heat exchanger 23 to the compressor 21 cannot be increased further. That is, the discharge temperature of the compressor 21 cannot be reduced by the opening degree control of the outdoor expansion valve 24. On the contrary, in the case where the opening degree De of the outdoor expansion valve 24 is not full open, the amount of the refrigerant that flows from the outdoor heat exchanger 23 to the compressor 21 can be increased by further increasing the opening degree De of the outdoor expansion valve 24. That is, the discharge temperature of the compressor 21 can be reduced by the opening degree control of the outdoor expansion valve 24.

In addition, "increase" in the control aspect of the outdoor fan 27 means to increase the rotational speed level in the outdoor fan rotational speed table 400 in FIG. 3 by one. Meanwhile, "reduce" means to reduce the rotation level by one, and "maintain" means not to change the rotational speed level. For example, in the case where the current rotational speed level is 5 (the rotational speed: 500 rpm), the rotational speed level is increased by one and set to "6" (the rotational speed: 600 rpm) when the control aspect of the outdoor fan 27 that is extracted from the outdoor fan control table 300 is "increase", the rotational speed level is reduced by one and set to "4" (the rotational speed: 400 rpm) when the control aspect is "reduce", and the rotational speed level is maintained to "5" when the control aspect is "maintain".

Here, a detailed description will be made on a reason why the control aspects of the outdoor fan 27 are defined differently according to the suction pressure PL, the suction superheating degree SHs, and the opening degree of the outdoor expansion valve 24 in the outdoor fan control table 300.

First, the case where the suction superheating degree SHs is equal to or less than the threshold superheating degree C. will be described. In this case, as described above, the temperature of the refrigerant that is suctioned into the compressor 21 is low. Thus, it is considered to be able to execute control in which the discharge temperature of the compressor 21 does not exceed the performance upper limit value only by the opening degree control of the outdoor expansion valve 24. Accordingly, the rotational speed of the outdoor fan 27 is controlled such that the suction pressure PL becomes equal to or more than the first threshold pressure A and lower than the second threshold pressure B.

More specifically, in the case where the suction pressure PL detected by the low-pressure sensor 32 is lower than the first threshold pressure A, the temperature of the outdoor heat exchanger 23 may be equal to the temperature at which frosting occurs. For this reason, the rotational speed level of the outdoor fan 27 is increased by one from the current rotational speed level, so as to increase the rotational speed of the outdoor fan 27. Thus, the evaporation capacity of the outdoor heat exchanger 23 is increased, and the evaporation pressure is increased. That is, the suction pressure PL is increased.

In addition, in the case where the suction pressure PL detected by the low-pressure sensor 32 is equal to or more than the second threshold pressure B, the temperature of the outdoor heat exchanger 23 may be sufficiently higher than the temperature at which frosting occurs. Furthermore, the pressure difference between the high-pressure side pressure and the low-pressure side pressure of the refrigerant circuit 100 may be reduced. For this reason, the rotational speed level of the outdoor fan 27 is reduced by one from the current rotational speed level, so as to reduce the rotational speed of the outdoor fan 27. Accordingly, the noise caused by driving of the outdoor fan 27 is reduced, and the pressure difference between the high-pressure side pressure and the low-pressure side pressure of the refrigerant circuit 100 can be secured.

In addition, in the case where the suction pressure PL detected by the low-pressure sensor 32 is equal to or more than the first threshold pressure A and lower than the second threshold pressure B, the rotational speed level of the outdoor fan 27 is maintained at the current rotational speed level so as to maintain the rotational speed of the outdoor fan 27 in order to avoid the temperature of the outdoor heat exchanger 23 from being reduced to the temperature at which frosting occurs and in order to secure the pressure difference between the high-pressure side pressure and the low-pressure side pressure of the refrigerant circuit 100 while avoiding the increase in the noise caused by the driving of the outdoor fan 27.

Next, a description will be made on the case where the suction superheating degree SHs exceeds the threshold superheating degree C. In this case, as described above, the temperature of the refrigerant that is suctioned into the compressor 21 is high. Thus, in the case where the discharge temperature of the compressor 21 is increased, particularly, the opening degree of the outdoor expansion valve 24 becomes full open, and the discharge temperature of the compressor 21 cannot be reduced by the opening degree control of the outdoor expansion valve 24, the discharge temperature of the compressor 21 may exceed the performance upper limit value. Accordingly, by the control of the rotational speed of the outdoor fan 27, prevention of the increase in the discharge temperature of the compressor 21 is prioritized over adjustment of the suction pressure PL to be equal to or more than the first threshold pressure A and lower than the second threshold pressure B.

More specifically, in the case where the suction pressure PL detected by the low-pressure sensor 32 is lower than the second threshold pressure B and where the opening degree of the outdoor expansion valve 24 is full open, the rotational speed level of the outdoor fan 27 is reduced by one from the current rotational speed level, so as to reduce the rotational speed of the outdoor fan 27. Accordingly, the evaporation capacity of the outdoor heat exchanger 23 is degraded, and the suction superheating degree SHs of the compressor 21 is reduced. For this reason, even in the case where the opening degree of the outdoor expansion valve 24 is full open, the discharge temperature of the compressor 21 is reduced.

In addition, unless the opening degree of the outdoor expansion valve 24 is full open, the rotational speed level of the outdoor fan 27 is maintained at the current rotational speed level, so as to maintain the rotational speed of the outdoor fan 27. Accordingly, the increase in the discharge temperature of the compressor 21 can be suppressed by the opening degree control of the outdoor expansion valve 24 while the increase in the suction superheating degree SHs of the compressor 21, which is caused by the increase in the evaporation capacity in the outdoor heat exchanger 23, is suppressed.

Then, in the case where the suction pressure PL detected by the low-pressure sensor 32 is equal to or more than the second threshold pressure B, similar to the case where the suction superheating degree SHs is equal to or less than the threshold superheating degree C., the rotational speed level of the outdoor fan 27 is reduced by one from the current rotational speed level, so as to reduce the rotational speed of the outdoor fan 27. Accordingly, the suction superheating degree SHs of the compressor 21 is reduced, and thus the discharge temperature of the compressor 21 is reduced. In addition, the noise caused by the driving of the outdoor fan 27 is reduced. Furthermore, the pressure difference between the high-pressure side pressure and the low-pressure side pressure of the refrigerant circuit 100 can be obtained.

Figure 4:
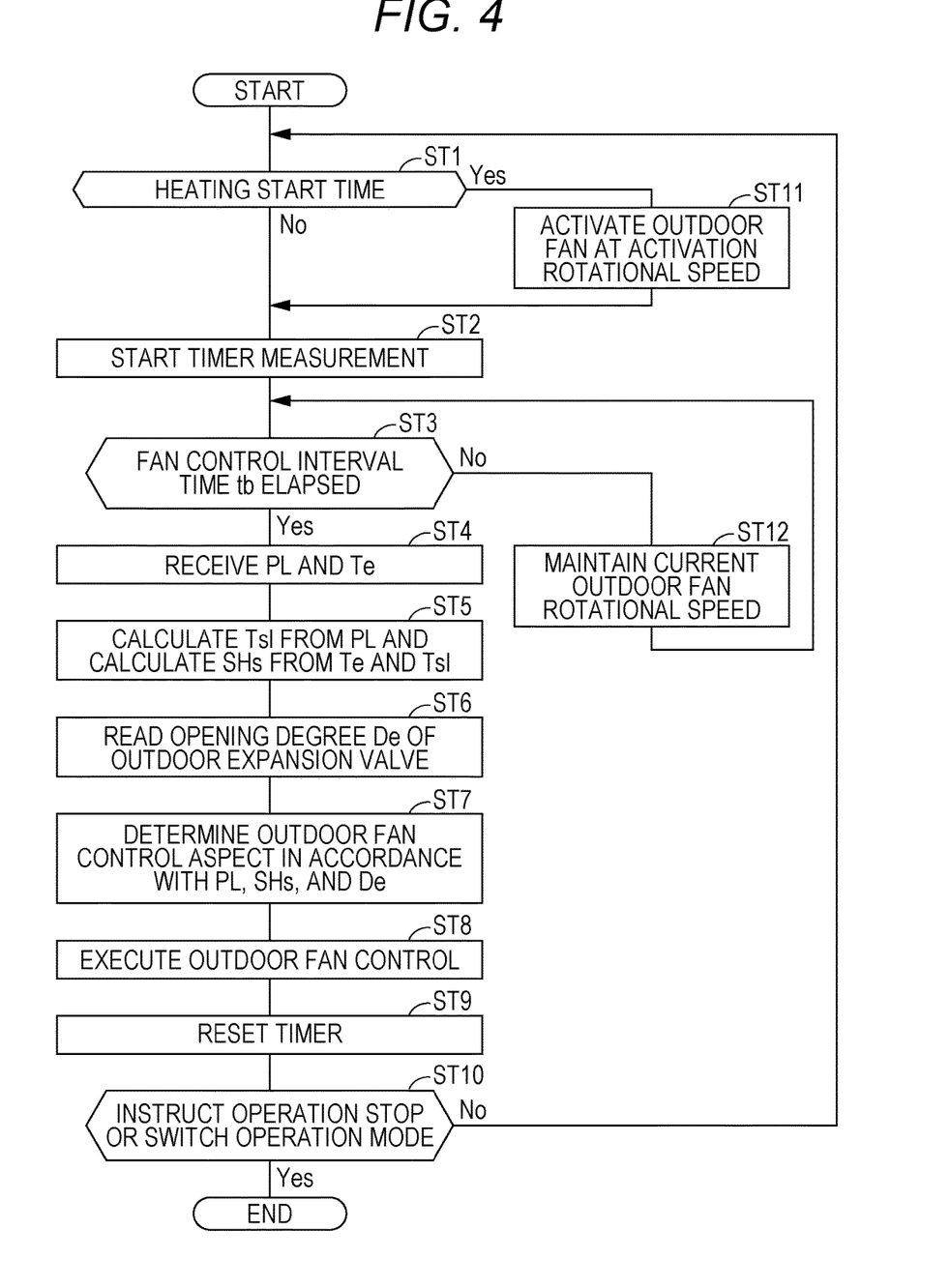
FIG. 4 is a flowchart for explaining a process during outdoor fan control in the embodiment of the present invention.

Next, a description will be made on the control of the outdoor fan 27 in the air conditioner 1 of this embodiment by using FIGS. 1 to 4. FIG. 4 depicts a flow of a process related to the control of the outdoor fan 27 that is executed by the CPU 210 of the outdoor unit control means 200 in the case where the air conditioner 1 performs the heating operation. In FIG. 4, ST indicates step, and numerals following this indicate step numbers. It should be noted that the description will be centered on the process related to the present invention in FIG. 4. A description will not be made on the process other than the above, for example, a general process related to the air conditioner 1, such as control of the refrigerant circuit that corresponds to an operation condition of the setting temperature, an air amount, or the like that are instructed by a user.

First, the CPU 210 determines whether the current time is heating operation start time (ST1). Here, it is determined whether the current time is a time point at which a start of the heating operation is instructed by an operation start instruction by the user or a start of a time operation, or is in the heating operation.

If the current time is not the heating operation start time (ST1—No), the CPU 210 proceeds to the process in ST2. If the current time is the heating operation start time (ST1—Yes), the CPU 210 activates the outdoor fan 27 at an activation rotational speed (ST11) and proceeds to the process in ST2. The CPU 210 receives the ambient air temperature that is detected by the ambient air temperature sensor 36 at the heating operation start time via the sensor input unit 240, and determines the rotational speed level of the outdoor fan 27 by using the received ambient air temperature. Then, the CPU 210 refers to the outdoor fan rotational speed table 400, extracts the rotational speed of the fan that corresponds to the determined rotational speed level, and activates the outdoor fan 27 at the extracted rotational speed.

In ST2, the CPU 210 starts timer measurement. Next, the CPU 210 determines whether a fan control interval time tb has elapsed since the timer measurement is started in ST2. As described above, in the present invention, in the case where the suction pressure PL is lower than the second threshold pressure B and where the suction superheating degree SHs exceeds the threshold superheating degree C., the control aspect of the outdoor fan 27 is changed in accordance with the opening degree of the outdoor expansion valve 24. At this time, in the case where a control interval time ta of the outdoor expansion valve 24 is equal to the control interval time tb of the outdoor fan 27, the control of the rotational speed of the outdoor fan 27 is frequently switched, and thus the control may be unstabilized. Accordingly, the control of the rotational speed of the outdoor fan 27 is stabilized by extending the fan control interval time tb to be longer than the control interval time ta of the outdoor expansion valve 24 (for example, the fan control interval time tb: 5 minutes, the control interval time ta of the outdoor expansion valve 24: 1 minute).

If the fan control interval time tb has not elapsed (ST3—No), the CPU 210 maintains the current rotational speed of the outdoor fan 27 (ST12) and returns the process to ST3. If the fan control interval time tb has elapsed (ST3—Yes), the CPU 210 receives the suction pressure PL of the compressor 21 that is detected by the low-pressure sensor 32 and a temperature Te of the refrigerant that is suctioned into the compressor 21 and detected by the suction temperature sensor 34 (hereinafter described as the suction temperature Te) via the sensor input unit 240 (ST4). The CPU 210 stores the received suction pressure PL and suction temperature Te in the storage unit 220.

Next, the CPU 210 calculates a saturation temperature corresponding to the evaporation pressure Ts1 by using the received suction pressure PL and calculates the suction superheating degree SHs of the compressor 21 by using the suction temperature Te and the saturation temperature corresponding to the evaporation pressure Ts1 (ST5). The suction superheating degree SHs can be obtained by subtracting the saturation temperature corresponding to the evaporation pressure Ts1 from the suction temperature Te.

Next, the CPU 210 reads the current opening degree De of the outdoor expansion valve 24 (ST6). The opening degree De of the outdoor expansion valve 24 is stored in the storage unit 220 and is stored, for example, as the number of pulses that corresponds to the opening degree De of the outdoor expansion valve 24 and is added to the outdoor expansion valve 24 (the number of pulses given to the stepping motor provided in the outdoor expansion valve 24).

Next, the CPU 210 uses the received suction pressure PL and opening degree De of the outdoor expansion valve 24 as well as the calculated suction superheating degree SHs, refers to the outdoor fan control table 300, and determines the control aspect of the outdoor fan 27 (ST7). Then, the CPU 210 executes the control of the outdoor fan 27 in accordance with the control aspect that is determined by referring to the outdoor fan control table 300 (ST8). The CPU 210 extracts the rotational speed level that corresponds to the determined control aspect, and drives the outdoor fan 27 at the rotational speed that corresponds to the extracted rotational speed level. The CPU that has executed the control of the outdoor fan 27 resets the timer (ST9).

Next, the CPU 210 determines whether an instruction of operation stop or switching of an operation mode (the heating operation→the cooling and/or defrosting operation) of the air conditioner 1 that is made by an instruction of the user, timer operation stop, or the like is present (ST10). If the instruction of the operation stop or switching of the operation mode of the air conditioner 1 is not present (ST10—No), the CPU 210 returns the process to ST1. If the instruction of the operation stop or switching of the operation mode of the air conditioner 1 is present (ST10—Yes), the CPU 210 terminates the process.

As described above, the air conditioner of the present invention can prevent the discharge temperature of the compressor from being increased to exceed the performance upper limit value while suppressing frosting on the outdoor heat exchanger by appropriately executing the control of the outdoor fan in accordance with the suction pressure and the suction superheating degree of the compressor.

DESCRIPTION OF REFERENCE SIGNS

1 Air conditioner
2 Outdoor unit
5a to 5c Indoor unit
21 Compressor
23 Outdoor heat exchanger
24 Outdoor expansion valve
27 Outdoor fan
31 Discharge temperature sensor
32 Low-pressure sensor
34 Suction temperature sensor
100 Refrigerant circuit
200 Outdoor unit control means
210 CPU
220 Storage unit
240 Sensor input unit
300 Outdoor fan control table
400 Outdoor fan rotational speed table
PL Suction pressure
SHs Suction superheating degree
Te Suction temperature
Ts1 Saturation temperature corresponding to the evaporation pressure
De Outdoor expansion valve opening degree

The invention claimed is:
1. An air conditioner comprising
an indoor unit and an outdoor unit that are coupled by a liquid pipe and a gas pipe,
the outdoor unit having a compressor, a flow passage switching unit, an outdoor heat exchanger, an outdoor expansion valve, an outdoor fan, a suction pressure detector, a suction temperature detector, and an outdoor unit controller, the suction pressure detector detecting suction pressure that is pressure of a refrigerant suctioned into the compressor, the suction temperature detector detecting a suction temperature that is a temperature of the refrigerant suctioned into the compressor, and the outdoor unit controller controlling the outdoor fan in accordance with the detected suction pressure when the outdoor heat exchanger functions as an evaporator, wherein the outdoor unit controller calculates a suction superheating degree that is a superheating degree of the refrigerant suctioned into the compressor by using the detected suction pressure and the detected suction temperature, when the suction superheating degree is equal to or less than a predetermined threshold superheating degree, the outdoor unit controller controls the outdoor fan such that the suction pressure becomes equal to or more than a first threshold pressure and lower than a second threshold pressure, the first threshold pressure being higher by a predetermined value than an evaporation pressure corresponding to a predetermined frosting temperature of the outdoor heat exchanger, the second threshold pressure being higher than the first threshold pressure, and the outdoor unit controller controls the outdoor fan such that the suction superheating degree becomes equal to or less than the threshold superheating degree when the suction superheating degree is higher than the threshold superheating degree and the suction pressure is lower than the second threshold pressure.

2. The air conditioner according to claim 1, wherein when the suction superheating degree is equal to or less than the threshold superheating degree, the outdoor unit controller increases a rotational speed of the outdoor fan in the case where the suction pressure is lower than the first threshold pressure, and maintains the rotational speed of the outdoor fan at a current rotational speed in the case where the suction pressure is equal to or more than the first threshold pressure and lower than the second threshold pressure, when the suction pressure is equal to or more than the second threshold pressure, the outdoor unit controller reduces the rotational speed of the outdoor fan, when the suction superheating degree is higher than the threshold superheating degree and the suction pressure is lower than the second threshold pressure, the outdoor unit controller reduces the rotational speed of the outdoor fan in the case where an opening degree of the outdoor expansion valve is full open, and maintains the rotational speed of the outdoor fan at the current rotational speed in the case where the opening degree of the outdoor expansion valve is not full open.

* * * * *